United States Patent Office 2,899,361
Patented Aug. 11, 1959

2,899,361

SOPORIFIC CAPSULE

Shelby Clyde McMillion, Detroit, Mich., assignor to R. P. Scherer Corporation, Detroit, Mich., a corporation of Michigan No Drawing. Application June 23, 1952
Serial No. 295,117

2 Claims. (Cl. 167—83)

This invention relates to gelatin capsules containing 3-methyl-pentyne-ol-3.

The above alcohol is a volatile liquid having a boiling point ranging from 119° to 122° C. The alcohol is soluble in water as a 10% solution.

This alcohol has recently been found to be an excellent soporific. For this purpose, the alcohol must be administered orally. However, it cannot be administered per se, as in a spoon, because of taste and other factors, but must be capsulated.

The capsules must be dissolved rapidly in the stomach, for a delay in the absorption of the alcohol is highly undesirable.

I have found that when the alcohol in question is enclosed within conventional gelatin capsule (made from a gelatin mass consisting essentially of gelatin, water and glycerin), the alcohol rapidly permeates the capsule shell or wall, even when mixed with an oil before being capsulated, and thereafter evaporates. In other words, the alcohol in question cannot be successfully capsulated in conventional gelatin capsules.

It is, therefore, an important object of the present invention to provide gelatin capsules filled with 3-methyl-pentyne-ol-3 that are capable of holding the said alcohol, in other words, are not permeable to the alcohol.

Other and further objects and features of the present invention will become apparent from the following description and appended claims.

I have found that if for the glycerin conventionally employed as a plasticizer in making gelatin capsules, I substitute sorbitol, then the capsule shells or walls are practically impermeable to the said alcohol in mixtures or dispersions containing the same (disclosed herein below) filling the capsules. But when mixtures of glycerin and sorbitol are similarly employed, the alcohol still permeates the capsule shells or walls.

At a sorbitol content of from 15 to 40%, the gelatin content of the mass used for capsule making ranges from about 25 to 45% depending upon the degree of hardness or softness desired in the finished capsules. In other words, the gelatin to sorbitol ratio may range from 3:1 to 1:1⅓. The balance is essentially water. As and when made, the capsule walls or shells contain from about 30 to 45% water. When thereafter dehydrated (as disclosed hereinbelow), the water content of the capsule walls or shells is reduced down to 9 to 12% of the weight of the gelatin shell.

Capsules filled with the alcohol in question may be prepared as disclosed in the following paragraphs.

A gelatin mass is first provided comprising gelatin water and sorbitol (by way of a plasticizer). The compositions may be prepared by placing the gelatin in a pony mixer, a Hobart mixer, or in any other suitable mixer, adding the plasticizer and milling the resulting mixture to form a paste. Water is then added and the milling continued until a fluffy mass is obtained. This mass is then transferred to a melter, kept under a more or less complete vacuum and heated until a smooth, fluid mass is obtained. This fluid mass may then be used for the manufacture of capsules. By way of examples, I tabulate hereinbelow the compositions of a number of gelatin compositions suitable for capsule making.

| Composition No. | Gelatin | Sorbitol | Water |
|---|---|---|---|
| | Percent | Percent | Percent |
| 1 | 40.97 | 15.43 | 43.60 |
| 2 | 36.8 | 25.81 | 37.39 |
| 3 | 29.61 | 37.47 | 33.92 |

It should be noted that in the above table each non-aqueous ingredient has been tabulated by weight on a dry basis, so that the tabulated water content is a measure of the added water together with the water contents of the non-aqueous ingredients.

Filled gelatin capsules may be prepared from a plastic gelatin mass such as those disclosed hereinabove by forming the composition into two plastic sheets and marginally welding two such sheets together around a drop or globule of liquid which will form the content of the resulting capsule, as described in the patent to Robert P. Scherer, No. 1,970,396. Immediately after such a capsule has been formed, the wall or shell thereof still contains the water content of the gelatin mass for which the capsule has been made. For this reason, the capsules are relatively weak when first made. To make the capsules stronger, they are, therefore, dehydrated, as by exposure to dry warm air or to acetone or to some other agent capable of extracting water from the capsule wall or shell. After such dehydration, the manufacturing process has been completed and the capsules are considered to be in finished or final form.

The capsules in question are generally circular in transverse cross section. The capsules may have a rounded or globular shape or may be more or less elongated or tubular, having rounded ends. In such tubular capsules, the cross sectional area between the capsule ends may be more or less uniform, or the capsules may taper toward their ends.

The wall or shell thickness of conventional gelatin capsules ranges typically, say, from 0.018 to 0.030 inch and may average about 0.025 inch.

According to one form of the present invention, the above-noted alcohol is mixed or diluted with an edible ester of a fatty acid, in particular, a glyceride oil (such as corn oil, olive oil, sesame oil, peanut oil, or the like), or with another edible ester of ethyl alcohol, propylene glycol, glycerin, polyethylene glycol, or polyoxyethylene (20) sorbitan, or the like mono- or polyhydric alcohols (such as ethyl oleate, glyceryl mono oleate, glyceryl dioleate, propylene glycol monolaurate, triacetin, polyoxyethylene (20) sorbitan mono oleate, or the like). The preferred ester to alcohol ratio is 50:50, although other proportions such as 40:60 or 60:40, can also be used. The liquid solutions so obtained may be thickened, if desired, by including therewith a thickening agent (such as bees' wax or polyethylene glycol 4000) or a jelling agent (such as ethyl cellulose, soaps, and the like). These liquid solutions are easily capsulated and the resulting capsules retain their alcohol content for a long time without appreciable loss.

According to another form of the present invention, the above-noted alcohol is mixed or diluted with a polyethylene glycol or with a polyethylene glycol mixture that is liquid at capsulating temperature. I can use polyethylene glycols commonly identified by the numbers 400, 600, 1000, 1500, or mixtures therewith of higher molecular weight polyethylene glycols, such as numbers 1540, 4000, or 6000. These numerical designations roughly approximate the average molecular weight of the polymers. For example, the compound designated as polyethylene glycol 400 contains a mixture of polymers ranging in molecular weight from 194 to 679. The compounds gradually change from liquids to solids as the molecular weight increases, the transposition beginning at a molecular weight of about 1000. Reference is made to an article by McClelland et al. in Chemical and Engineering News for February 10, 1945, in which the properties of these compounds are described in detail.

It should be understood that the above-noted polyethylene glycols are not the equivalents of the esters mentioned hereinabove. This is evidenced, inter alia, by the fact that a 90:10 mixture of said alcohol with one of the polyethylene glycols will retain the alcohol (when capsulated) as well or better than a 50:50 alcohol-ester mixture (when capsulated). It is believed that the polyethylene glycols have a sufficiently strong absorptive affinity for the alcohol in question to prevent its outward migration through the capsule shell.

Usually, a single capsule will contain from 250 to 500 milligrams of the alcohol in question, for instance, 275 milligrams.

By way of examples, I have capsulated 50:50 mixtures of the alcohol in question with peanut oil, olive oil, and ethyloleate, using, for each mixture, all three compositions tabulated in column 2. I have also capsulated a 90:10 mixture of said alcohol with polyethylene glycol 400 U.S.P., using all three compositions tabluated in column 2.

Many details may be varied without departing from the principles of this invention and it is, therefore, not my purpose to limit the patent granted on this invention otherwise than necessitated by the scope of the appended claims.

What is claimed is:

1. A gelatin capsule containing a mixture comprising 3-methyl-pentyne-ol-3 and a vehicle consisting of polymers of ethylene glycol having an average molecular weight of from 400 to 6000, which vehicle is liquid at capsulating temperature, said capsule having walls made up of gelatin and sorbitol together with water, the ratio of gelatin to sorbitol ranging from 3:1 to 1:1⅓.

2. A method of encapsulating a mixture comprising 3-methyl-pentyne-ol-3 and a vehicle consisting of polymers of ethylene glycol having an average molecular weight of from 400 to 6000, which vehicle is liquid at capsulating temperature, which comprises forming a hot fluid aqueous gelatin mass containing sorbitol, the ratio of gelatin to sorbitol ranging from 3:1 to 1:1⅓, into capsule form around a quantity of said mixture.

References Cited in the file of this patent

UNITED STATES PATENTS

| | | |
|---|---|---|
| 1,649,671 | Dohme | Nov. 15, 1927 |
| 1,970,396 | Scherer | Aug. 14, 1934 |
| 2,111,504 | Bockmuhl | Mar. 15, 1938 |
| 2,149,005 | Bockmuhl | Feb. 28, 1939 |
| 2,578,943 | Palermo | Dec. 18, 1951 |

OTHER REFERENCES

Speel: Am. J. of Phar., April 1941, p. 137.
Drug Trade News, October 29, 1951, pp. 35, 51.
Lyman: Am. Phar. (1945), p. 456.
Drug Trade News, October 1, 1951, p. 34.
Remington: Practice of Pharm., 9th ed., 1948, p. 311.
U.S. Dispensatory, 24th ed., 1947, pp. 1384, 1385.
Allen: Quart, Bull. of Sea View Hosp., vol. 12, April 1951, pp. 61–64.
Lasagna: J. of Pharmacology and Exp. Ther., vol. 111, May 1954, pp. 9–20.
U.S. Disp., 24th ed., 1947, pp. 849, 867.

UNITED STATES PATENT OFFICE
CERTIFICATE OF CORRECTION

August 11, 1959

Patent No. 2,899,361

Shelby Clyde McMillion

It is hereby certified that error appears in the printed specification of the above numbered patent requiring correction and that the said Letters Patent should read as corrected below.

Column 1, line 56, and column 4, lines 6 and 13, second ratio, for "1:1 1/3", each occurrence, read -- 1:1 3/5 --.

Signed and sealed this 26th day of January 1960.

(SEAL)
Attest:

KARL H. AXLINE
Attesting Officer

ROBERT C. WATSON
Commissioner of Patents